US010839223B1

(12) United States Patent
Jiang et al.

(10) Patent No.: US 10,839,223 B1
(45) Date of Patent: Nov. 17, 2020

(54) SYSTEM AND METHOD FOR LOCALIZATION OF ACTIVITIES IN VIDEOS

(71) Applicant: Fudan University, Shanghai (CN)

(72) Inventors: Yugang Jiang, Shanghai (CN); Shaoxiang Chen, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 16/684,364

(22) Filed: Nov. 14, 2019

(51) Int. Cl.
*G06K 9/00* (2006.01)
*G06K 9/62* (2006.01)
*G06N 3/04* (2006.01)
*G06N 3/08* (2006.01)
*G06F 16/735* (2019.01)

(52) U.S. Cl.
CPC ....... *G06K 9/00718* (2013.01); *G06F 16/735* (2019.01); *G06K 9/00744* (2013.01); *G06K 9/6256* (2013.01); *G06N 3/04* (2013.01); *G06N 3/08* (2013.01); *G06K 2009/00738* (2013.01)

(58) Field of Classification Search
CPC .......... G06F 16/70; G06F 16/75; G06F 16/73; G06F 16/732; G06F 16/735; G06K 9/00711; G06K 9/00718; G06K 9/00744; G06K 2009/00738; G06K 9/6256; G06N 3/02; G06N 3/04; G06N 3/08
USPC .......................................... 382/305, 156–158
See application file for complete search history.

(56) References Cited

U.S. PATENT DOCUMENTS 7,283,992 B2 * 10/2007 Liu .................... G06F 16/40
2004/0249774 A1 * 12/2004 Caid .................... G06K 9/4623
706/14

OTHER PUBLICATIONS

Gao, Jiyang, et al. "TALL: Temporal Activity Localization via Language Query." 2017 IEEE International Conference on Computer Vision (ICCV). IEEE, 2017. (Year: 2017).*
Ge, Runzhou, et al. "MAC: Mining Activity Concepts for Language-based Temporal Localization." 2019 IEEE Winter Conference on Applications of Computer Vision (WACV). IEEE, 2019. (Year: 2019).*
Hendricks, Lisa Anne, et al. "Localizing Moments in Video with Natural Language." 2017 IEEE International Conference on Computer Vision (ICCV). IEEE, 2017. (Year: 2017).*

(Continued)

*Primary Examiner* — Geoffrey E Summers
(74) *Attorney, Agent, or Firm* — Brad Bertoglio; Intelink Law Group, P.C.

(57) ABSTRACT

A system for activity localization in videos is described, comprising a visual concept detection module, which produces a plurality of first visual concept vectors each representing a probability of containing visual concepts for one of a plurality of sampled frames sampled from an input video; wherein each of the plurality of first visual concept vectors dot-product with a second visual concept vector extracted from a given query sentence, resulting a visual-semantic correlation score; a semantic activity proposal generation module, which generates semantic activity proposals by temporally grouping frames with a high visual-semantic correlation score; and a proposal evaluation and refinement module, which takes the semantic activity proposals, the visual concept vectors and the query sentence as input, and outputs alignment scores and refined boundaries for the proposals. The disclosure also relates to methods thereof.

19 Claims, 3 Drawing Sheets

(56) References Cited

OTHER PUBLICATIONS

Yuan, Yitian, Tao Mei, and Wenwu Zhu. "To Find Where You Talk: Temporal Sentence Localization in Video with Attention Based Location Regression." arXiv preprint arXiv:1804.07014 (2018). (Year: 2018).*

Zhang, Zhu, et al. "Cross-Modal Interaction Networks for Query-Based Moment Retrieval in Videos." arXiv preprint arXiv: 1906.02497 (2019). (Year: 2019).*

Shaoxiang Chen and Yu-Gang Jiang, "Semantic Proposal for Activity Localization in Videos via Sentence Query", Association for the Advancement of Artificial Intelligence (published Jan. 2019).

* cited by examiner (a) Query sentence: drop yolk from egg shell into smaller glass, discard egg shell into trash.

(b) Query sentence: the person gets a glass mug from the cupboard and places it on the countertop.

SYSTEM AND METHOD FOR LOCALIZATION OF ACTIVITIES IN VIDEOS

TECHNICAL FIELD

This invention is related to a system for temporal localization of activities in videos, and more particularly, for temporal localization of activities in videos via query sentence. This invention is also related to a method thereof.

BACKGROUND

Recognizing "what's happening" in videos is a crucial task of visual understanding. Recent success of deep learning and computer vision has advanced this task from action classification to detection i.e. temporal localization of actions in videos. Traditional action detection approaches makes one important assumption: the actions to be detected are atomic and in a predefined list. Thus these approaches are insufficient to describe and detect the combination of a series of actions.

Current approaches to localization problems in computer vision, either spatial or temporal, are mostly based on "proposal and classification": candidate regions are first generated by a separate method, and then fed to a classifier to get the probabilities of containing the target classes. State-of-the-art action proposal generation methods make predictions based on the "actionness" score of every short snippets in the videos. The actionness of a snippet is class-agnostic, just a quantification of the likelihood of containing a generic action instance. Moreover, the actionness judgment will assign low score to relatively static scenes which may contain objects.

There has been a large number of studies about action classification using deep convolutional neural networks (CNNs). Tran et al. have extended the 2D CNN architecture used in image classification tasks to 3D, which includes temporal dimension and can model short-term motion in video clips ("Learning spatiotemporal features with 3d convolutional networks", ICCV, 2015). Simonyan et al. have combined two 2D CNNs which model RGB image and optical flow image to predict the actions in videos ("Two-stream convolutional networks for action recognition in videos", NIPS, 2014). 3D convolution and optical flow are not enough to model long-term motion information in untrimmed videos, thus later works focused on aggregating temporal information. Karpathy et al. have proposed various kinds of temporal information fusion strategies for CNN inputs ("Large-scale video classification with convolutional neural networks", CVPR, 2014). Ng et al. have used the Long Short Term Memory (LSTM) as a feature aggregation technique ("Beyond short snippets: Deep networks for video classification", CVPR, 2015). Wang et al. have integrated non-local operation (which can be viewed as a form of attention) into 3D CNN to model relations between consecutive frames ("Non-local neural networks", CoRR abs/1711.07971, 2017). However, these methods deal with trimmed videos or untrimmed videos which contain single action instance. Hence they don't consider the temporal localization of actions.

Temporal action localization methods are based on action proposals, which generates a limited number of candidate temporal regions. A major group of action proposal methods are based on "actionness grouping". Zhao et al. have trained an actionness classifier to evaluate the binary actionness probabilities for individual snippets and then use the proposed temporal actionness grouping (TAG) the generate proposals ("Temporal action detection with structured segment networks", ICCV, 2017). Such strategy is also adopted by later works. Yuan et al. ("Temporal action localization by structured maximal sums", CVPR, 2017) and Lin et al. ("BSN: boundary sensitive network for temporal action proposal generation", ECCV, 2018) have devised algorithms to compose action proposals based on the probabilities of starting, course, and ending of every time point of the videos. Another group of works first generate anchors of variable length at every temporal position and then evaluate them by predicting 0/1 actionness label or action class label. Escorcia et al. ("Daps: Deep action proposals for action understanding", ECCV, 2016) and Buch et al. ("SST: single-stream temporal action proposals", CVPR, 2017) have used an LSTM or GRU unit to process the feature sequence of a video to produce K proposals at each time step. Gao et al. have proposed to generate and evaluate a clip pyramid at every anchor unit in the frame sequence ("TURN TAP: temporal unit regression network for temporal action proposals", ICCV, 2017). Lin et al. have also used convolutional layer to produce anchors hierarchically with different granularities ("Single shot temporal action detection", ACM MM, 2017). Xu et al. have designed 3D convolutional network to map a video snippet to predictions of anchor segments ("R-C3D: region convolutional 3d network for temporal activity detection", ICCV, 2017).

Video retrieval with sentence requires retrieving the videos/images from a set of candidates that match the given sentence query. Wang et al. have embedded image and text into the same space via the proposed deep structure-preserving image-text embeddings ("Actionness estimation using hybrid fully convolutional networks", CVPR, 2016). Karpathy et al. have embedded object regions and words into the same multi-modal space, then region-word pairwise similarities are computed and reduced to image-sentence score for retrieval ("Deep visual-semantic alignments for generating image descriptions", CVPR, 2015). To retrieve videos via complex textual queries, Lin et al. have parsed the sentences into semantic graphs and match them to visual concepts in the videos ("Visual semantic search: Retrieving videos via complex textual queries", CVPR, 2014).

Hendricks et al. have proposed to localize moments in video via natural language with a dataset named DiDeMo ("Localizing moments in video with natural language", ICCV, 2017). However, the annotated temporal boundaries are coarse since each video is segmented into 5-second segments. They propose a sentence-to-video retrieval method named Moment Contextual Network (MCN) to tackle the localization problem since the number of possible temporal segments are very limited.

Gao et al. have proposed a Cross-modal Temporal Regression Localizer (CTRL), which use dense sliding window to produce activity proposals, then encode visual and textual information with a multi-modal processing network to produce visual-textual alignment score and location regression ("TALL: temporal activity localization via language query", ICCV, 2017). But proposals produced by sliding window ignore the relation between temporal regions and the sentence queries. The Attention Based Location Regression (ABLR) of Yuan et al. does not rely on proposals to localize activities ("To find where you talk: Temporal sentence localization in video with attention based location regression", CoRR abs/1804.07014, 2018). They encode the visual and textual features with Bi-LSTM and directly regress the temporal locations based on the visual-textual co-attention weights. Thus, this method is unable to generate multiple predictions for a sentence query. These existing methods overlooked the importance of generating activity proposals, let alone integrating textual information into proposal generation.

There is a need to provide a new and improved mechanism for localizing activities in videos.

SUMMARY

In this application, the aim is to tackle temporal localization of "activities" in videos via "sentence" queries, which is a more desirable setting. There are three major differences compared to traditional action localization:
(1) Activities are more complex than atomic actions like boxing or drinking. The definition of activity adopted here is actually the same as "high-level event": an activity is composed by several actions or interactions. The latter is more common and is the process of a subject interacting with an object. They may happen in order or co-occur.
(2) Sentences are not constrained to a predefined list. They are variable regarding both structure and content, thus can describe various activities.
(3) The videos usually contain multiple different activity instances and each may span a long duration.

To tackle the challenge of activity proposal generation for sentence query, in this application it is proposed a novel Semantic Activity Proposal (SAP) framework to integrate the semantic information in sentences into the activity proposal generation process. We first train a visual concept detection CNN with paired sentence-clip training data. The visual concepts are selected from training sentence according to their frequencies. For proposal generation, the visual concepts extracted from the query sentence and video frames are used to compute visual-semantic correlation score for every frame. Activity proposals are generated by grouping frames with high visual-semantic correlation score. Finally, the visual features of video frames, the visual concept vectors and the textual features of query sentence are utilized to compute a visual-textual alignment score and a refinement of the temporal boundaries for proposals.

In one aspect of this application, it is provided a system for activity localization in videos, comprising:

a visual concept detection module, which produces a plurality of first visual concept vectors each representing a probability of containing visual concepts for one of a plurality of sampled frames sampled from an input video; wherein each of the plurality of first visual concept vectors dot-product with a second visual concept vector extracted from a given query sentence, resulting a visual-semantic correlation score;

a semantic activity proposal generation module, which generates semantic activity proposals by temporally grouping frames with a high visual-semantic correlation score; and a proposal evaluation and refinement module, which takes the semantic activity proposals, the visual concept vectors and the query sentence as input, and outputs alignment scores and refined boundaries for the proposals.

Preferably, the visual concept detection module is a CNN trained with sentence-clip-paired training data, wherein a sentence is paired with a clip that contains a section of video having a start time and an end time.

Preferably, the visual concepts are selected from training sentence according to their frequencies.

In one aspect of this application, it is provided a method for activity localization in videos, said method comprises:

sampling a plurality of frames from an input video;

generating a first visual concept vector for each of the plurality of sampled frames; wherein visual concept is defined as visible object and actions in videos, and the visual concept vectors represent probabilities of containing common visual concepts for the sampled frames;

generating a second visual concept vector extracted from a given query sentence for the input video;

resulting a visual-semantic correlation score for each of the plurality of sampled frames by dot-producing each of the first visual concept vector with the second visual concept vector;

generating semantic activity proposals by temporally grouping frames with a high visual-semantic correlation score; wherein the semantic activity proposals each comprises temporal boundaries;

outputting alignment scores and refined temporal boundaries simultaneously for the semantic activity proposals based on the semantic activity proposals, the first visual concept vectors and the given query sentence, wherein the alignment scores are used to rank the semantic activity proposals.

Preferably, the temporal boundaries of the semantic activity proposals are start time and end time of the semantic activity proposals.

Preferably, the step of generating a first visual concept vector is implemented by using a CNN trained with sentence-clip-paired training data, wherein a sentence is paired with a clip that contains a section of video having a start time and an end time.

Preferably, the visual concepts are selected from training sentence according to their frequencies.

Preferably, the visual concepts are words describing color, objects, and/or motions.

Preferably, the first visual concept vector is a vector containing probability values between 0 and 1, and/or the second visual concept vector is a binary vector.

Preferably, the frames with the high visual-semantic correlation score are positive frames that are related to the query sentence.

Preferably, the high visual-semantic correlation score is a visual-semantic correlation score above a threshold.

Preferably, the threshold is 0.5.

Preferably, the threshold is determined by using a binary-search algorithm.

Preferably, the ratio of positive frames does not exceed 0.1.

Preferably, the ratio of positive frames does not exceed 0.06.

Preferably, a tolerance is introduced to control the ratio of negative frames allowed in a temporal region during the temporal grouping.

Preferably, the semantic activity proposals are generated with a predefined length inside the temporal regions of the grouped frames by using sliding windows.

Preferably, the predefined length is 128 frames.

Preferably, the predefined length is 256 frames.

Preferably, the stride of the sliding window is ⅛ of the predefined length.

This application has provided a novel and much improved approach. A novel proposal generation algorithm and framework for temporal activity localization via sentence queries is proposed. The proposed Semantic Activity Proposal (SAP), is a novel work to integrate semantic information of sentences into proposal generation. The proposed framework not only achieves superior localization performance over the state-of-the-art (e.g. on the TACoS dataset and the Charades-STA dataset), but also reduced the average number of proposals by a factor of at least 10, which is a significant improvement of efficiency.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. In addition, it is understood that any titles or sub-titles used in this application are only for illustrative, other than limitative purpose.

The patent or application file contains at least one drawing executed in color. Copies of this patent or patent application publication with color drawing(s) will be provided by the Office upon request and payment of the necessary fee.

Figure 1:
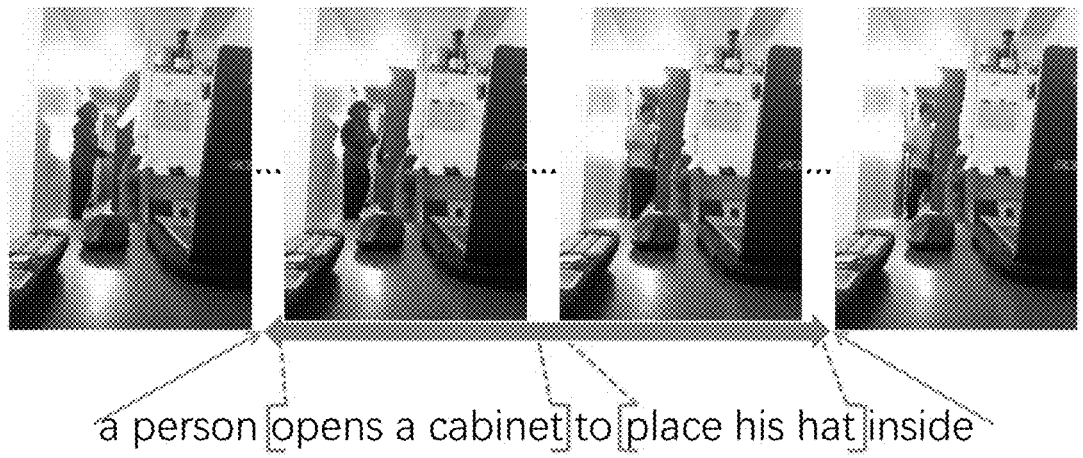
Figure 2:
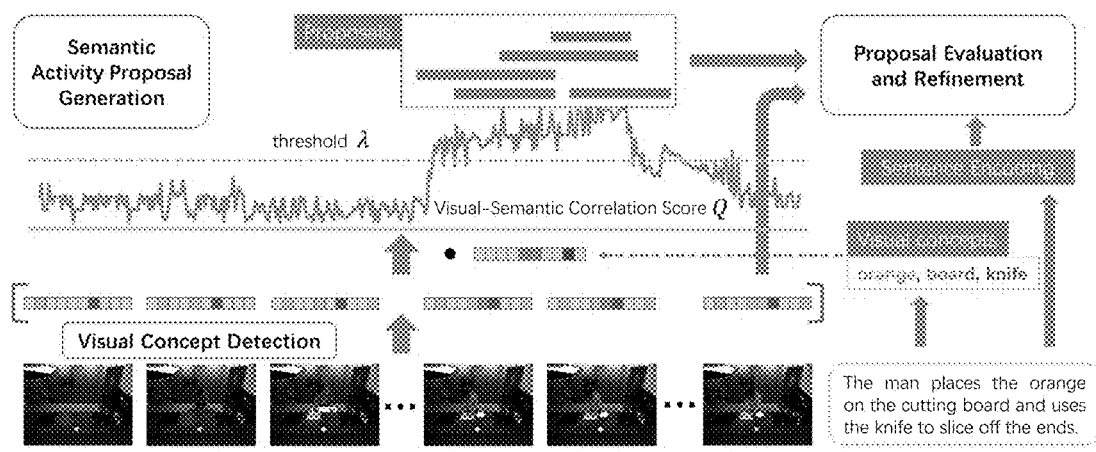
Figure 3:
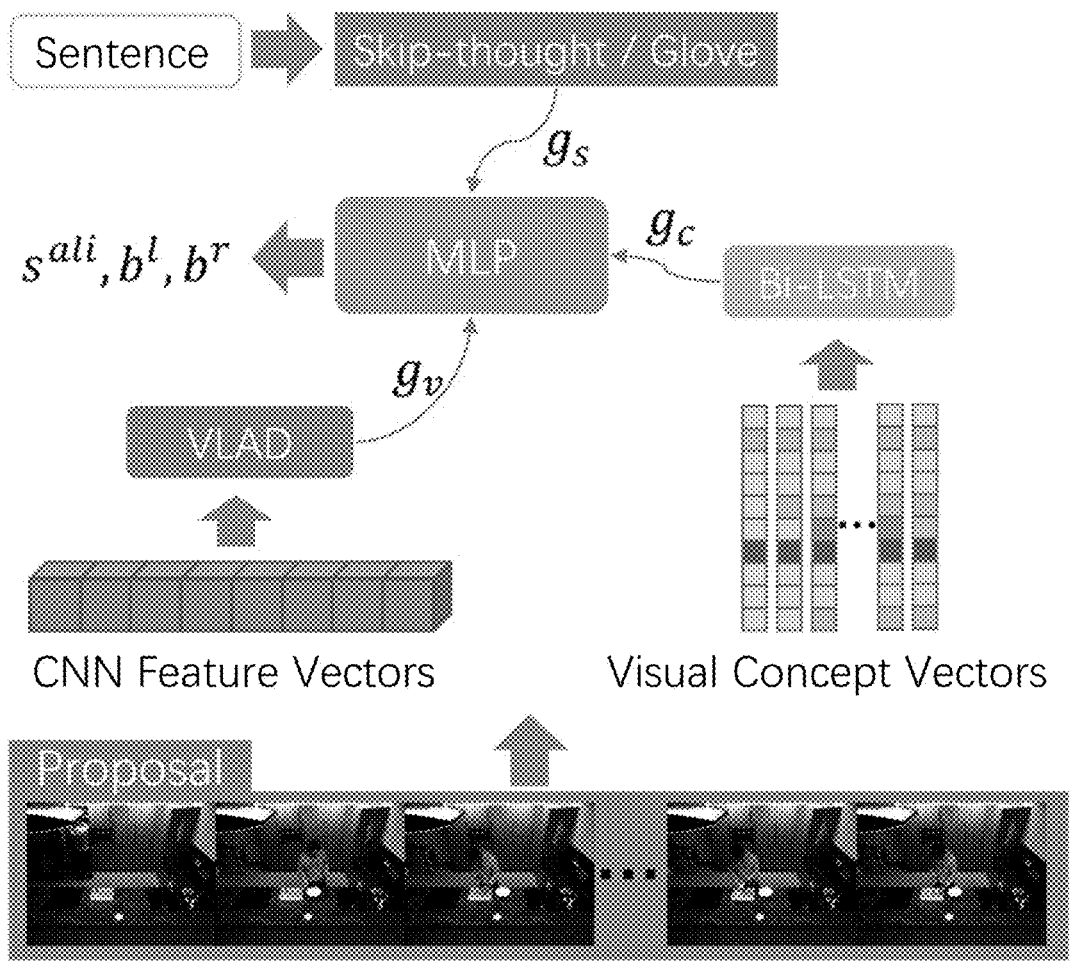
Figure 4:
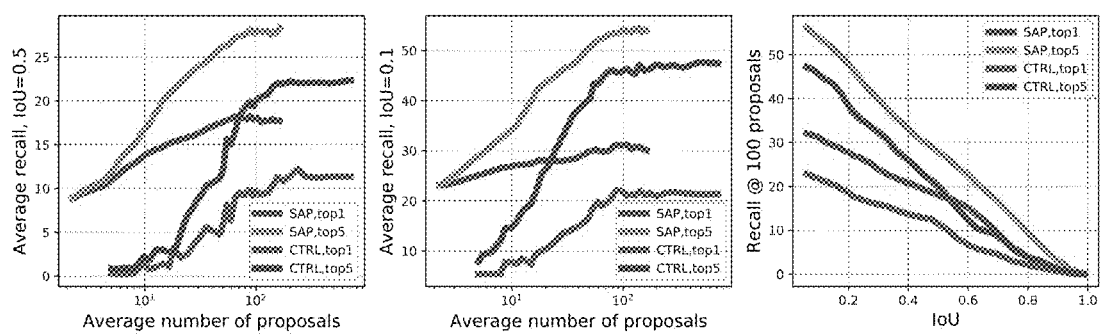
Figure 5A:
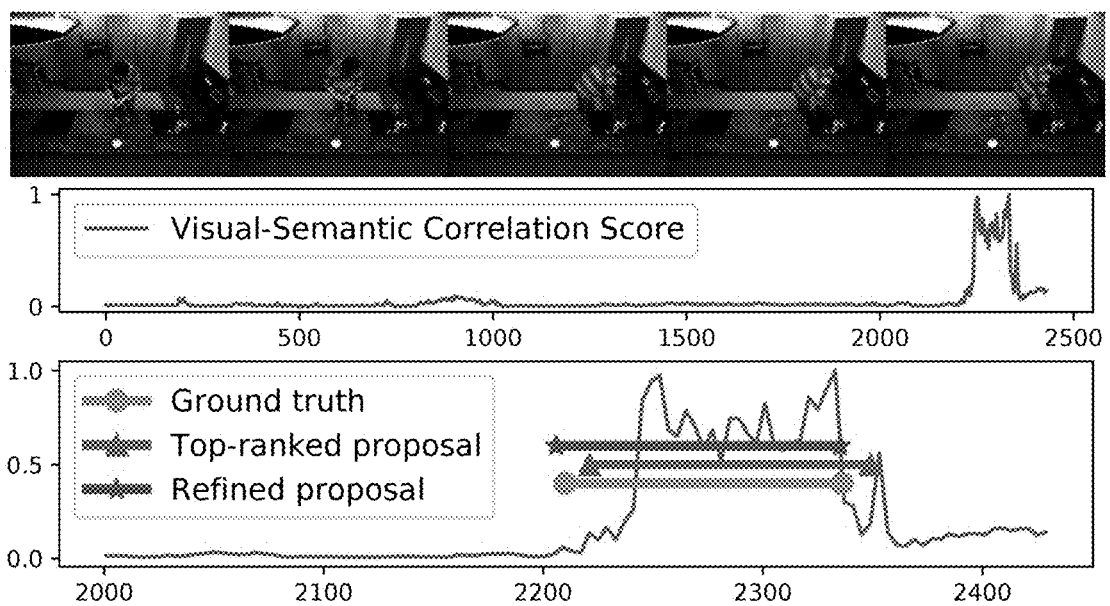
Figure 5B:
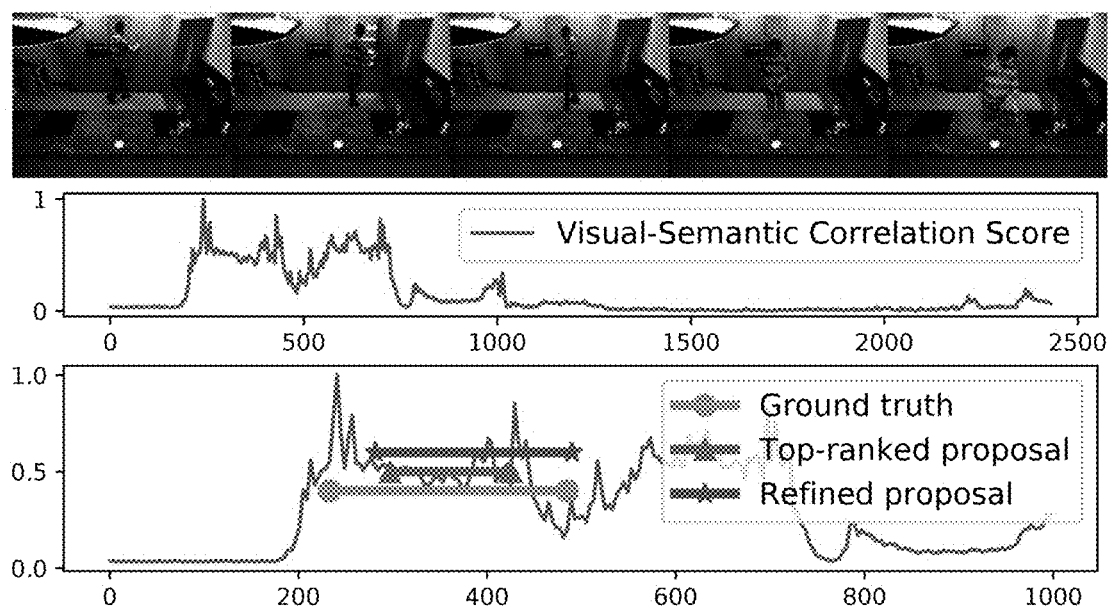

Wherein:

FIG. 1 shows an example of temporal activity localization via sentence query;

FIG. 2 shows a proposed framework according to our invention for temporal activity localization via sentence query;

FIG. 3 shows the details of proposal evaluation and refinement according to this invention;

FIG. 4 illustratively shows the comparison result of the Semantic Activity Proposal method of this application with other methods on the TACoS dataset; and FIGS. 5a and 5b illustratively show the qualitative results to gain an intuition about the effectiveness of the Semantic Activity Proposal of this application.

EMBODIMENTS

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 1 shows an example of temporal activity localization via sentence query, in which the query sentence is "a person opens a cabinet to place his hat inside", which describes an activity composed by two interactions involving two objects: cabinet and hat.

FIG. 2 shows a proposed framework according to our invention for temporal activity localization via sentence query.

There are three main components of the framework according to this invention:
(1) Visual Concept Detection produces a first visual concept vector, which represents of probabilities of containing common visual concepts, for each of sampled frames. These first visual concept vectors dot-product with a second visual concept vector extracted from query sentence. Results are the visual-semantic correlation score. Each sampled frame has a corresponding score.
(2) Semantic Activity Proposals are generated by temporally grouping frames with high correlation score. The semantic activity proposals each comprises temporal boundaries.
(3) Proposal Evaluation and Refinement takes the semantic activity proposals, first visual concept vectors and query sentence as input, and simultaneously outputs alignment scores and refined boundaries for the proposals.

A video V is denoted as a sequence of frames: $V=\{f_t\}_{t=1}^T$. Each video is associated with a set of temporal annotations $A=\{(d_j, s_j, e_j)_{j=1}^N\}$, where N is the number of annotations, $d_j$ is the sentence description, the corresponding clip of video V starts at frame $s_j$ and ends at frame $e_j$. The start and end time for a given query sentence is to be predicted.

In this application, "visual concept" is defined as the visible object and actions in the videos. They are described by the sentences, thus the words in the sentences correspond to visual concepts in the video frames, such as "orange", "cup", and "wash". While there are no spatial bounding box annotations for the words, a visual concept detector can be trained by using Multiple Instance Learning (MIL). "Visual feature" of a video frame is a high-level representation of its visual content, which is computed by feeding the frame to a CNN and extracting the activation from the fc6 layer.

In this application, K most common words (visual concepts) are first selected in all the training sentences. Each sentence, or to say, sentence description $d_j$ can then be converted to a binary vector $c_j$, where $c_j^k$ equals to 1 means word k is in the sentence, and 0 otherwise. Meanwhile, it is assumed that every frame of the corresponding clip will contain the visual concepts in $d_j$. Thus it is randomly sampled a frame $f_j$ from the clip $(s_j, e_j)$ as the input to visual concept detector. The "visual concept detector" is defined as a function $F_{vcd}(f_j)$ that maps an image to a visual concept vector $p_j$.

Inside $F_{vcd}$, a CNN $F_{cnn}$ is utilized as visual feature extractor, whose input is an image $f_j$ and output is a feature map $M_j$. $M_j^{h,w}$ is the feature vector of length m for image region indexed by h, w, which is transformed by a fully-connected layer:

$$P_j^{h,w} = \text{sigmoid}(M_j^{h,w}W + b), \quad (1)$$

where $W \in \mathbb{R}^{m \times K}$ and $b \in \mathbb{R}^K$ are trainable parameters. $P_j^{h,w}$ is then the word probability vector of image region indexed by h, w. The noisy-OR version of MIL is used to compute the final probability for the whole image:

$$p_j = 1 - \prod_{h,w}(1 - \mathcal{P}_j^{h,w}), \quad (2)$$

where $p_j$ is a vector of length K and $p_j^k$ stands for the probability of word k appearing in frame $f_j$. $p_j$ is denoted as the visual concept vector for frame $f_j$.

Equations (1) and (2) conclude the details of the visual concept detector $F_{vcd}$. To learn the parameters of $F_{vcd}$, it is adopted the cross-entropy loss:

$$Loss_{vcd} = -\sum_{k=1}^K c_j^k \log p_j^k. \quad (3)$$

With the visual concept extractor $F_{vcd}$, visual concept vectors can be obtained for each frame of video V: $P=\{p_t\}_{t=1}^{T}$, where $p_t=F_{vcd}(f_t)$. Then the visual-semantic correlation scores between the query sentence $d_j$ and frames can be represented as $Q_j=\{Q_j^t\}_{t=1}^{T}$, where $$q_j^t = p_t \cdot c_j. \quad (4)$$

$q_j^t$ stands for the total probabilities of frame t containing all the visual concepts in query j. $Q_j$ is then normalized to [0, 1].

As shown in FIG. 2, frames with more visual concepts described in $d_j$ tend to get higher correlation score. Frames with score above a threshold $\lambda$ are considered positive, i.e. related to the sentence query. This threshold is preferably set as 0.5. A binary-search algorithm is used to determine $\lambda$, such that the ratio of positive frames does not exceed 0.1, and preferably, not exceed 0.06. This value is chosen to make a balance between the number of generated proposals and the recall, and is decided on the validation set. When the positive frames are selected, an algorithm (algorithm 1, see infra.) is used to group the positive frames into consecutive temporal regions. To account for false negative frames, an extra parameter $\tau$ is introduced as the tolerance ratio, which controls the ratio of negative frames allowed in a temporal region. The activity proposals are finally generated with a predefined length inside the grouped temporal regions by using sliding window. In a preferable embodiment, the predefined length is 128 frames; while in another preferable embodiment, the predefined length is 256 frames. Preferably, the stride of the sliding window is ⅛ of the predefined length. The person in the art will understand that other proper values of proportion also falls within the scope of this application.

Algorithm 1 (see infra.) shows the details of the temporal grouping process in one embodiment according to our application.

---

Algorithm 1 Semantic Activity Proposal Generation

---

1: function SEMANTIC ACTIVITY PROPOSAL(Q, $\lambda$, $\tau$)
2:  R ← θ                                ▷ Grouped temporal regions
3:  G ← θ                                ▷ Generated proposals
4:  end ← True
5:  for t = 1 to T do
6:   if end then
7:    if $Q_t \geq \lambda$ then          ▷ Start a new temporal group
8:     s ← t
9:     end ← False
10:  else
11:   r ← ratio of $Q_i \geq \lambda$ in [s,t]    ▷ Get positive ratio
12:   if r < $\tau$ then                  ▷ Positive ratio under tolerance
13:    end ← True
14:    add [s, t] to R                    ▷ End current temporal group
15: for s, t in R do
16:  for L in proposalLengths do          ▷ List of lengths
17:   propL ← sliding windows of L in [s, t]
18:   add propL to G
19: return G

---

FIG. 3 shows the details of proposal evaluation and refinement.

For a specific query $(d_j, s_j, e_j)$, the generated proposals are denoted by $G_j=\{(l_n, r_n)\}_{n=1}^{N_j}$, where $N_j$ is the number of proposals and $l_n$, $r_n$ are the temporal boundaries. $G_j$ will be evaluated to produce alignment scores, which are then used to rank the proposals.

Since the generated proposals have fixed lengths, their boundaries will be further refined to localize the activities more precisely. First, the visual feature vectors and visual concept vectors of the frames inside proposal region are extracted from a pre-trained CNN, denoted by $f_v$ and $f_c$, respectively.

Next, these vectors are aggregated as a single feature vector. For visual features, the trainable VLAD encoding ("Learnable pooling with context gating for video classification", Miech et al., CoRR abs/1706.06905, 2017) has been adopted. For visual concept vectors, since the order of the sequence is important, A bi-directional LSTM is used to encode the sequence and concatenate the final state vectors of both directions. The feature aggregation is summarized as follows:

$$g_v = \text{VLAD}(f_v),$$

$$g_c = [\text{LSTM}_{fw}(f_c), \text{LSTM}_{bw}(f_c)]. \quad (5)$$

For the query sentence, experiments (see infra.) have been conducted with two kinds of off-the-shelf sentence encoding method: Skip-thought ("Skip-thought vectors", Kiros et al., NIPS, 2015) and Glove ("Glove: Global vectors for word representation", Pennington et al., EMNLP, 2014).

The encoded sentence feature vector is denoted as $g_s$. Then the alignment score and boundary refinement is computed as:

$$s^{ali} = \text{MLP}(g_s \otimes g_v, 1),$$

$$b^l, b^r = \text{MLP}(g_s \otimes g_c, 2), \quad (6)$$

where $\otimes$ is element-wise product, and MLP(,u) is a multi-layer perceptron whose final layer has u outputs. $b^l$ and $b^r$ are the predicted offset for the start and end points of the proposal.

During training, alignment scores between all the sentence-proposal pairs in a mini-batch have been computed, and the model according to this application is encouraged to output low scores for negative pairs and high scores for positive pairs.

Thus the alignment loss is defined as:

$$\text{Loss}_{ali} = \frac{1}{B}\sum_{i=1}^{B}\left[\log(1+\exp(-s_{i,i}^{ali})) + \sum_{j=1, j\neq i}^{B} \alpha\log(1+\exp(s_{i,j}^{ali}))\right], \quad (7)$$

where $\alpha$ is a hyper-parameter to balance the loss of positive and negative pairs.

The boundary refinement loss is defined as:

$$\text{Loss}_{ref} = \sum_{i=1}^{B}[H(b_i^l - (l_i - s_i)) + H(b_i^r - (r_i - e_i))], \quad (8)$$

where $l_i$ and $s_i$ are the proposal and annotated starting points, likewise for $r_i$ and $e_i$. H( ) is the Huber loss function.

The final loss for training the proposal evaluation module is:

$$\text{Loss} = \text{Loss}_{ali} + \beta \text{LOSS}_{ref}, \quad (9)$$

where $\beta$ is a hyper-parameter to balance the alignment and refinement loss.

Experiments

Two datasets are used in our experiments: TACoS and Charades-STA.

The TACoS dataset is built on the MPII Cooking Composite Activities ("A database for fine grained activity detection of cooking activities", Rohrbach et al., CVPR, 2012; and "Script data for attribute-based recognition of composite activities", Rohrbach et al., ECCV, 2012), which contains fine-grained temporal annotations of cooking activities. There are 127 videos in the dataset. Following previous work, here the dataset is split into training, validation and test sets with 75, 27 and 25 videos, respectively. Each annotation contains one sentence and the start and end time of the activity it describes in the video. The numbers of annotations in training, validation and test sets are 10146, 4589 and 4083, respectively. The average length of the sentences is 6.2 words, the average duration of the videos is 287.1 seconds, and the average number of activities per video is 21.4.

The Charades-STA dataset is built on the Charades dataset ("Hollywood in homes: Crowdsourcing data collection for activity understanding", Sigurdsson et al., ECCV, 2016), which contains 9848 videos of daily indoors activities collected through Amazon Mechanical Turk. There are 16128 clip-sentence pairs in the released Charades-STA dataset, which are split into training and test sets of 12408 and 3720 clip-sentence pairs, respectively. The average length of the sentences is 8.6 words, the average duration of the videos is 29.8 seconds, and the average number of activities per video is 2.3.

For training the visual concept detector, common visual concepts are collected on both datasets. Concretely, we count the words of training sentences, discard stop words and keep words whose occurrence are at least 2 as the visual concepts. This results in 912 and 566 visual concepts on the TACoS dataset and Charades-STA dataset, respectively.

The VGG16 network pre-trained on ImageNet is used as the backbone of our visual concept detector. We discard its layers after fc6 and use the rest as the feature extractor. For each annotated temporal region, one frame is uniformly sampled and resized to 512×512 pixels as the input at every training step. The Momentum algorithm is used with a learning rate of $10^5$ and batch size of 16 to train the visual concept detector.

In the proposal evaluation module of FIG. 3, the visual feature is extracted from the visual concept detector's fc6 layer. The number of clusters for VLAD is 64 and the number of units for LSTM is 1024. The Skip-thought encoding produces one vector of length 4800 for each sentence. The Glove encoding maps each word to a vector of length 300, and the sequence is further encoded by using an LSTM with 1024 units.

The hyper-parameters in the losses, $\alpha$ and $\beta$ are 0.015 and 0.01, respectively. During training, the proposals are generated by dense sliding window method. For each annotation, it is to generate sliding windows of length [64, 128, 256, 512] frames for the video to cover the annotated temporal region. Only windows having temporal IoU≥0.5 with at least one annotated interval are used for training. Each mini-batch is sampled such that there does not exist any pair of sentences that describes the same clip, this ensures there is only one positive sentence for each proposal in the batch and $Loss_{ali}$ is correctly computed. The final loss is optimized by the Adam algorithm with a learning rate of 10-4 and batch size of 64. For evaluation, the generated proposal lengths are in [128, 256] (decided based on the statistics of the datasets).

The performance of temporal localization is measured by average recall rate of top-n results at certain temporal IoU (Intersection over Union), which is the "R@n, IoU=m" in Table 1 and Table 2, shown in percentage (see infra.). The recall of one sentence query $d_j$, $r(n, m, d_j)$, is 1 if the top-n returned results contains at least one that has a temporal IoU≥m, otherwise it is 0. The average recall rate is the average over all the queries:

$$R(n, m) = \frac{1}{N} \sum_{j=1}^{N} r(n, m, d_j).$$

Five methods are compared in the experiment:
1. Random: Activity proposals are generated by sparse sliding windows with [128, 256] frames and 20% stride, then temporal regions are randomly selected from proposals;
2. SST (see supra.): The original SST method generates dense proposals with various lengths as each time step. In our experiments, we train SST with dense proposal lengths. For evaluation, the proposals are [128, 256] frames and post-processed by non-maximum suppression.
3. CTRL (see supra.);
4. MCN (see supra.): The original MCN enumerates all possible temporal regions as candidates, but this is impractical for our settings. It is to use the same proposal generation algorithm as CTRL for MCN; and
5. ABLR (see supra.): ABLR is also implemented and tested on the datasets. Note that this method can't produce Recall@5 results.

TABLE 1

Comparison results on TACoS

| Method | R @ 1 IoU = 0.5 | R @ 1 IoU = 0.1 | R @ 5 IoU = 0.5 | R @ 5 IoU = 0.1 |
|---|---|---|---|---|
| Random | 0.71 | 3.28 | 3.72 | 15.47 |
| SST | 0.97 | 3.46 | 4.57 | 14.54 |
| CTRL | 13.30 | 24.32 | 25.42 | 48.73 |
| MCN | 5.58 | 14.42 | 10.33 | 37.35 |
| ABLR | 9.4 | 31.4 | — | — |
| $SAP_{glove}$ | 16.62 | 29.24 | 27.01 | 52.50 |
| $SAP_{noref}$ | 14.45 | 29.51 | 23.78 | 52.09 |
| $SAP_{sv}$ | 18.24 | 31.15 | 28.11 | 53.51 |

Table 1 shows the comparison results of different methods on TACoS, wherein the recall of top {1, 5} results at IoU threshold {0.1, 0.5} of different methods on the TACoS dataset. It is clear that traditional action proposal method SST doesn't work well under this setting. The reasons are mainly twofold:
(1) the proposals generate by SST are not aware of the specific activity described in the query sentence;
(2) the proposals are not ranked according to their correlation to the query sentence.

Since the videos in the TACoS dataset have long durations and contain multiple activities, methods that do not consider sentence information in proposal generation will suffer from a large number of proposals. CTRL and MCN use naive proposal generation algorithm, and also have this problem. They integrate sentence information only in the proposal evaluation and ranking process, which still leads to inferior performance. ABLR discards proposal generation. However, the attention based approach may suffer from low accuracy at the boundaries, which may be the reason why ABLR gets lower recall at higher IoU threshold.

The effectiveness of proposal refinement is demonstrated by ablation ($SAP_{noref}$), it is clear that adding proposal refinement leads to better localization performance. It is also found that Skip-thought vectors ($SAP_{sv}$) performs consistently better than Glove embeddings ($SAP_{glove}$). It is hypothesized the reason is that the number of training sentences is not large enough to train the encoding LSTM for Glove embeddings. Overall, the proposed method outperforms others by a significant margin. Notably, on the most important metric "R@1, IoU=0.5", SAP outperforms the best competitor CTRL by 37%.

TABLE 2

Comparison results on Charades-STA

| Method | R @ 1 IoU = 0.5 | R @ 1 IoU = 0.7 | R @ 5 IoU = 0.5 | R @ 5 IoU = 0.7 |
|---|---|---|---|---|
| Random | 8.51 | 3.03 | 37.12 | 14.06 |
| SST | 15.98 | 8.31 | 40.68 | 27.24 |
| CTRL | 23.63 | 8.89 | 58.92 | 29.52 |
| MCN | 17.46 | 8.01 | 48.22 | 26.73 |
| ABLR | 24.36 | 9.01 | — | — |
| $SAP_{glove}$ | 26.96 | 12.36 | 63.20 | 35.83 |
| $SAP_{sv}$ | 27.42 | 13.36 | 66.37 | 38.15 |

Table 2 shows the comparison results of different methods on Charades-STA, wherein the recall of top {1, 5} results at IoU threshold {0.5, 0.7} of different methods on the Charades-STA dataset.

A higher IoU threshold is chosen on this dataset because the videos are shorter and the number of activities per video is less compared to TACoS. For this reason, SST achieves higher performance on this dataset, which in turn indicates the importance of discriminative proposals on datasets of long videos. And it is also observed that there isn't a large difference between SAP and other methods regarding the number of generated proposals.

Thus the advantage of SAP can be attributed to the proposal evaluation and refinement process. Overall, the proposed SAP consistently outperforms other methods on this dataset. On the most important metric "R@1, IoU=0.7", SAP outperforms the best competitor ABLR by 48.3%.

FIG. 4 illustratively shows the comparison result of the SAP method of this application with other methods on the TACoS dataset.

Considering the video duration and number of activities in a video, a successful proposal method should be able to achieve high recall rate with "a small number of proposals". This is evaluated with two measurements: average number of proposals and average recall for a fixed number of proposals.

The left and center part of FIG. 4 shows the advantage of SAP over CTRL is significant both at high and low IoU threshold. SAP outperforms other methods on every metric and requires much less proposals. And SAP reaches peak performance at around 100 proposals. Notably, for IoU=0.5, SAP only needs around 20 proposals to achieve CTRL's peak top5 recall rate, which CTRL takes around 200 proposals. The result is likewise for IoU=0.1. This demonstrates the high efficiency of SAP. The right part of FIG. 4 plots the average recall rate for 100 proposals for SAP and CTRL. When the number of proposals is fixed to 100, SAP also consistently has the highest recall—the advantage of SAP is again significant, it outperforms CTRL at every IoU region.

| FIG. 3: Comparison of time consumption |||||
|---|---|---|---|---|
| Method |||||
| SAP(ours) | CTRL | MCN | SST | ABLR |
| Time 0.35 s | 1.76 s | 0.88 s | 0.33 s | 0.01 s |

Table 3 shows the comparison of time consumption for proposal generation and evaluation per query. Note that SST doesn't do proposal evaluation and ABLR generates single prediction without proposals, thus they are faster. The advantage of having less proposals can be seen from the comparison among SAP (this invention), CTRL and MCN.

Overall, these show that by integrating semantic information for activity proposal generation, SAP can produce a small number of discriminative proposals for faster evaluation and achieve high localization accuracy.

TABLE 4

Performances with different number of visual concepts on TACoS

| # Concepts | R @ 1 IoU = 0.5 | R @ 1 IoU = 0.7 | R @ 5 IoU = 0.5 | R @ 5 IoU = 0.7 |
|---|---|---|---|---|
| 1413 | 18.13 | 30.14 | 27.28 | 52.09 |
| 912 | 18.24 | 31.15 | 28.11 | 53.51 |
| 397 | 18.05 | 31.66 | 27.50 | 54.17 |
| 233 | 17.31 | 29.83 | 27.09 | 53.09 |
| 93 | 16.60 | 27.50 | 25.12 | 49.74 |

Table 4 shows the performances with different number of visual concepts on TACoS. To demonstrate the effect of visual concepts, experiments are conducted on the TACoS dataset with various numbers of visual concepts. It can be observed in Table 4 that with a small number of concepts, the model is likely to lose some semantic information during proposal generation. Thus, as the number of concepts increase (from 93 to 912), the performance will continue to improve. But an even larger number of concepts (e.g. 1413) will introduce noise into the model and hurt the performance.

FIGS. 5a and 5b illustratively show the qualitative results to gain an intuition about the effectiveness of the Semantic Activity Proposal, wherein the words shown in bold are defined as visual concepts; for FIG. 5a, the query sentence is "drop yolk from egg shell into smaller glass, discard egg shell into trash", while for FIG. 5b, the query sentence is "the person gets a glass mug from the cupboard and places it on the countertop". It can be observed that the visual semantic correlation score is a good indication of the temporal region of the activity even in a long video.

On the TACoS dataset, each video contains over 20 different activities which could span the duration of the whole video. It can be observed that the visual-semantic correlation scores are high around the ground truth regions and low for other regions. Thus the SAP of this invention can generate a small number of proposals for a long video while having high localization accuracy. Furthermore, the boundaries of the proposals can be refined to more accurately localize the activities as shown in the bottom of FIGS. 5a and 5b.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A method for activity localization in videos, said method comprising:
sampling a plurality of frames from an input video;
generating a first visual concept vector for each of the plurality of sampled frames, wherein visual concept is defined as visible objects and actions in videos, and the visual concept vectors represent probabilities of containing common visual concepts for the sampled frames;
generating a second visual concept vector extracted from a given query sentence for the input video;
producing a visual-semantic correlation score for each of the plurality of sampled frames by calculating dot-products between each of the first visual concept vectors and the second visual concept vector;
generating semantic activity proposals by temporally grouping frames with visual-semantic correlation scores above a threshold; wherein the semantic activity proposals each comprise temporal boundaries; and
outputting alignment scores and refined temporal boundaries simultaneously for the semantic activity proposals based on the semantic activity proposals, the first visual concept vectors and the given query sentence, wherein the alignment scores are used to rank the semantic activity proposals.

2. The method of claim 1, wherein the temporal boundaries of the semantic activity proposals are start time and end time of the semantic activity proposals.

3. The method of claim 1, wherein the step of generating a first visual concept vector is implemented by using a convolutional neural network (CNN) trained with sentence-clip-paired training data, wherein a sentence is paired with a clip that contains a section of video having a start time and an end time.

4. The method of claim 1, wherein the common visual concepts are selected from training according to their frequencies.

5. The method of claim 1, wherein the visual concepts are represented by words describing color, objects, and/or motions.

6. The method of claim 1, wherein the first visual concept vector is a vector containing probability values between 0 and 1, and/or the second visual concept vector is a binary vector.

7. The method of claim 1, wherein the frames with visual-semantic correlation scores above the threshold are positive frames that are related to the query sentence, and other frames are negative frames.

8. The method of claim 7, wherein the ratio of positive frames to total frames does not exceed 0.1.

9. The method of claim 7, wherein the ratio of positive frames to total frames does not exceed 0.06.

10. The method of claim 7, wherein a tolerance is introduced to control the ratio of negative frames to total frames allowed in a temporal region during the temporal grouping.

11. The method of claim 1, wherein the threshold is 0.5.

12. The method of claim 1, wherein the threshold is determined by using a binary-search algorithm.

13. The method of claim 1, wherein the semantic activity proposals are generated with a predefined length inside temporal regions of the grouped frames by using sliding windows.

14. The method of claim 13, wherein the predefined length is 128 frames.

15. The method of claim 13, wherein the predefined length is 256 frames.

16. The method of claim 13, wherein a stride of the sliding windows is ⅛ of the predefined length.

17. A non-transitory computer readable medium storing computer program instructions that, when executed by a processor, cause the processor to perform:
sampling a plurality of frames from an input video,
generating a first visual concept vectors for each of the plurality of sampled frames, wherein visual concept is defined as visible objects and actions in video, and the visual concept vectors each representing a probability of containing visual concepts for one of a plurality of sampled frames;
generating a second visual concept vector extracted from a given query sentence for the input video;
producing a visual-semantic correlation score for each of the plurality of sampled frames by calculating a dot-product of each of the first visual concept vectors with the second visual concept vector;
generating semantic activity proposals by temporally grouping frames with visual-semantic correlation scores above a threshold, wherein the semantic activity proposals each comprise temporal boundaries; and
outputting alignment scores and refined temporal boundaries simultaneously for the semantic activity proposals based on the semantic activity proposals, the first visual concept vectors and the given query sentence, wherein the alignment scores are used to rank the semantic activity proposals.

18. The non-transitory computer readable medium of claim 17, wherein the step of generating a first visual concept vector is implemented by using a convolutional neural network (CNN) trained with sentence-clip-paired training data, wherein a sentence is paired with a clip that contains a section of video having a start time and an end time.

19. The non-transitory computer readable medium of claim 17, wherein the visual concepts are selected from training according to their frequencies.

* * * * *